(12) United States Patent
Belfiore et al.

(10) Patent No.: US 9,218,327 B2
(45) Date of Patent: *Dec. 22, 2015

(54) OPTIMIZING THE LAYOUT OF ELECTRONIC DOCUMENTS BY REDUCING PRESENTATION SIZE OF CONTENT WITHIN DOCUMENT SECTIONS SO THAT WHEN COMBINED A PLURALITY OF DOCUMENT SECTIONS FIT WITHIN A PAGE

(75) Inventors: Ileana Belfiore, Dublin (IE); Stanley K. Jerrard-Dunne, Dublin (IE); Brendan P. Murray, Louth (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 636 days.

This patent is subject to a terminal disclaimer.

(21) Appl. No.: 13/447,955

(22) Filed: Apr. 16, 2012

(65) Prior Publication Data
US 2013/0007599 A1    Jan. 3, 2013

Related U.S. Application Data

(63) Continuation of application No. 13/172,903, filed on Jun. 30, 2011.

(51) Int. Cl.
*G06F 17/21* (2006.01)
*G06F 3/12* (2006.01)

(52) U.S. Cl.
CPC .......... *G06F 17/217* (2013.01); *G06F 3/1204* (2013.01); *G06F 3/1208* (2013.01); *G06F 3/1252* (2013.01); *G06F 3/1255* (2013.01)

(58) Field of Classification Search
CPC ..... G06F 3/125; G06F 17/217; G06F 3/1204; G06F 3/1208; G06F 2/1252; G06F 3/1255
USPC ......................................................... 715/252
See application file for complete search history.

(56) References Cited

U.S. PATENT DOCUMENTS 5,357,348 A * 10/1994 Moro ........................... 358/450
5,381,523 A    1/1995 Hayashi
(Continued)

OTHER PUBLICATIONS

Fan, J., et al., "Image object adaptation in variable data printing", Proceedings of SPIE, v SPIE-6076, p. 139-143, 2006.
(Continued)

*Primary Examiner* — Cesar Paula
*Assistant Examiner* — Tyler J Schallhorn
(74) *Attorney, Agent, or Firm* — Cuenot, Forsythe & Kim, LLC

(57) ABSTRACT

A method of optimizing a layout of an electronic document. An electronic document can be processed to identify a plurality of document sections within the document. A plurality of document sections can be recursively combined in at least a first page of a modified document and a presentation size of content within the document sections can be reduced. With each recursive combination of document sections, a first perceptual delta value can be generated based on perceptual differences between the document sections as originally presented in the electronic document and the document sections as presented when combined into the first page. When the first perceptual delta value at least equals the first threshold value, the recursive combination of document sections into the first page can cease.

7 Claims, 4 Drawing Sheets

(56) References Cited

U.S. PATENT DOCUMENTS

| | | | |
|---|---|---|---|
| 5,566,252 A * | 10/1996 | Miyaza | 382/298 |
| 5,777,753 A * | 7/1998 | McShane et al. | 358/302 |
| 5,825,942 A * | 10/1998 | Miyaza | 382/298 |
| 5,896,470 A * | 4/1999 | Miyaza | 382/298 |
| 5,959,744 A * | 9/1999 | Kohri et al. | 358/450 |
| 6,079,885 A * | 6/2000 | Sano | 400/76 |
| 6,603,493 B1 | 8/2003 | Lovell et al. | |
| 6,667,814 B1 * | 12/2003 | Tillotson | 358/1.15 |
| 6,924,904 B2 | 8/2005 | Stevens et al. | |
| 7,031,015 B2 | 4/2006 | Vidyanand | |
| 7,248,386 B2 * | 7/2007 | Nishi | 358/1.2 |
| 7,305,472 B2 | 12/2007 | Mighdoll et al. | |
| 7,580,149 B2 * | 8/2009 | Monga et al. | 358/1.16 |
| 8,050,587 B2 * | 11/2011 | Kurihara | 399/82 |
| 8,432,574 B2 * | 4/2013 | Kato | 358/1.18 |
| 8,451,489 B1 * | 5/2013 | Arora et al. | 358/1.18 |
| 2003/0184788 A1 * | 10/2003 | Watanabe et al. | 358/1.13 |
| 2004/0205607 A1 * | 10/2004 | Kim et al. | 715/517 |
| 2005/0172221 A1 | 8/2005 | Kobashi et al. | |
| 2009/0094198 A1 * | 4/2009 | Monga et al. | 707/3 |
| 2009/0213428 A1 | 8/2009 | Klippenstein | |
| 2011/0182422 A1 * | 7/2011 | Anderson et al. | 380/30 |
| 2012/0033237 A1 * | 2/2012 | Arora et al. | 358/1.9 |
| 2013/0128314 A1 * | 5/2013 | Chopra et al. | 358/1.18 |
| 2013/0128315 A1 * | 5/2013 | Arora et al. | 358/1.18 |

OTHER PUBLICATIONS

IBM, "Method for Document Printout Resource Optimization", IP.com No. IPCOM000190363D, Nov. 25, 2009.

McCool, C., "How to Reduce Printing Costs by 17%: A Guide to Doing Well and Doing Good by Printing Less," [online] GreenPrint Technologies, LLC, Sep. 2008, [retrieved Jun. 7, 2011] retrieved from the Internet: <http://www.printgreener.com/pdfs/GreenPrint%20White%20Paper%20September%2008.pdf>.

"pHash.org: Home of pHash, the open source perceptual hash library," [Online] E. Klinger & D. Starkweather, 2008-2010, [retrieved Jun. 7, 2011] retrieved from the Internet: <http://www.phash.org/>.

* cited by examiner

Original Document - One Sections Per page

First Pass - Two Document Sections Per page

Second Pass - Four Document Sections Per page

Third Pass - Nine Document Sections Per page

OPTIMIZING THE LAYOUT OF ELECTRONIC DOCUMENTS BY REDUCING PRESENTATION SIZE OF CONTENT WITHIN DOCUMENT SECTIONS SO THAT WHEN COMBINED A PLURALITY OF DOCUMENT SECTIONS FIT WITHIN A PAGE

CROSS-REFERENCE TO RELATED APPLICATIONS

This application is a continuation of U.S. application Ser. No. 13/172,903, entitled OPTIMIZING THE LAYOUT OF ELECTRONIC DOCUMENTS, and filed Jun. 30, 2011, the entirety of which is fully incorporated herein by reference.

BACKGROUND

The embodiments disclosed within this specification relate to optimizing the layout of electronic documents.

Users sometimes desire to customize a printout of an electronic document to minimize the amount of paper or ink/toner used to print the document. For example, some printers allow a user to use duplex printing, in which both sides of the paper are used to print a document. Some printers also allow a user to print multiple pages on one or both sides of each sheet of paper. Both the use of duplex printing and printing multiple pages per side save on the amount of paper used to print a document. Printing multiple pages per side also saves on the amount of ink or toner used to print the document.

The printing configuration typically is user-selectable via printing preferences provided by a device driver. A device driver is a computer program that allows higher-level computer programs to interact with a hardware device, such as a printer. Typically, printer manufacturers provide specific device drivers for their printers, and these device drivers are installed on the user's computer. The user can access the printing preferences via the computer's user interface.

BRIEF SUMMARY

The embodiments disclosed within this specification relate to optimizing the layout of electronic documents.

One embodiment of the present invention can include, within a system including a processor and a memory, a method of optimizing a layout of an electronic document. The method can include via the processor, processing the electronic document to identify a plurality of document sections within the document. The method also can include, recursively, combining a plurality of document sections in at least a first page of a modified document and reducing a presentation size of content within the document sections so that the combined document sections fit within the first page of the modified document. With each recursive combination of document sections, a first perceptual delta value can be generated based on perceptual differences between the document sections as originally presented in the electronic document and the document sections as presented when combined into the first page. A determination can be made as to whether the first perceptual delta value at least equals a first threshold value. When the first perceptual delta value at least equals the first threshold value, the recursive combination of document sections into the first page can cease. When the first perceptual delta value does not at least equal the first threshold value, the recursive combination of document sections in at least the first page can continue.

In one embodiment a first perceptual hash can be performed on the document sections as originally presented in the electronic document to determine a first perceptual hash value. A second perceptual hash can be performed on the document sections as presented when combined into the first page to determine a second perceptual hash value. Generating the first perceptual delta value can include comparing, the first and second perceptual hash values.

Yet another embodiment of the present invention can include a computer program product including a computer-readable storage medium having computer-readable program code that, when executed, causes a machine to perform the various steps and/or functions described herein.

DETAILED DESCRIPTION

Figure 1:
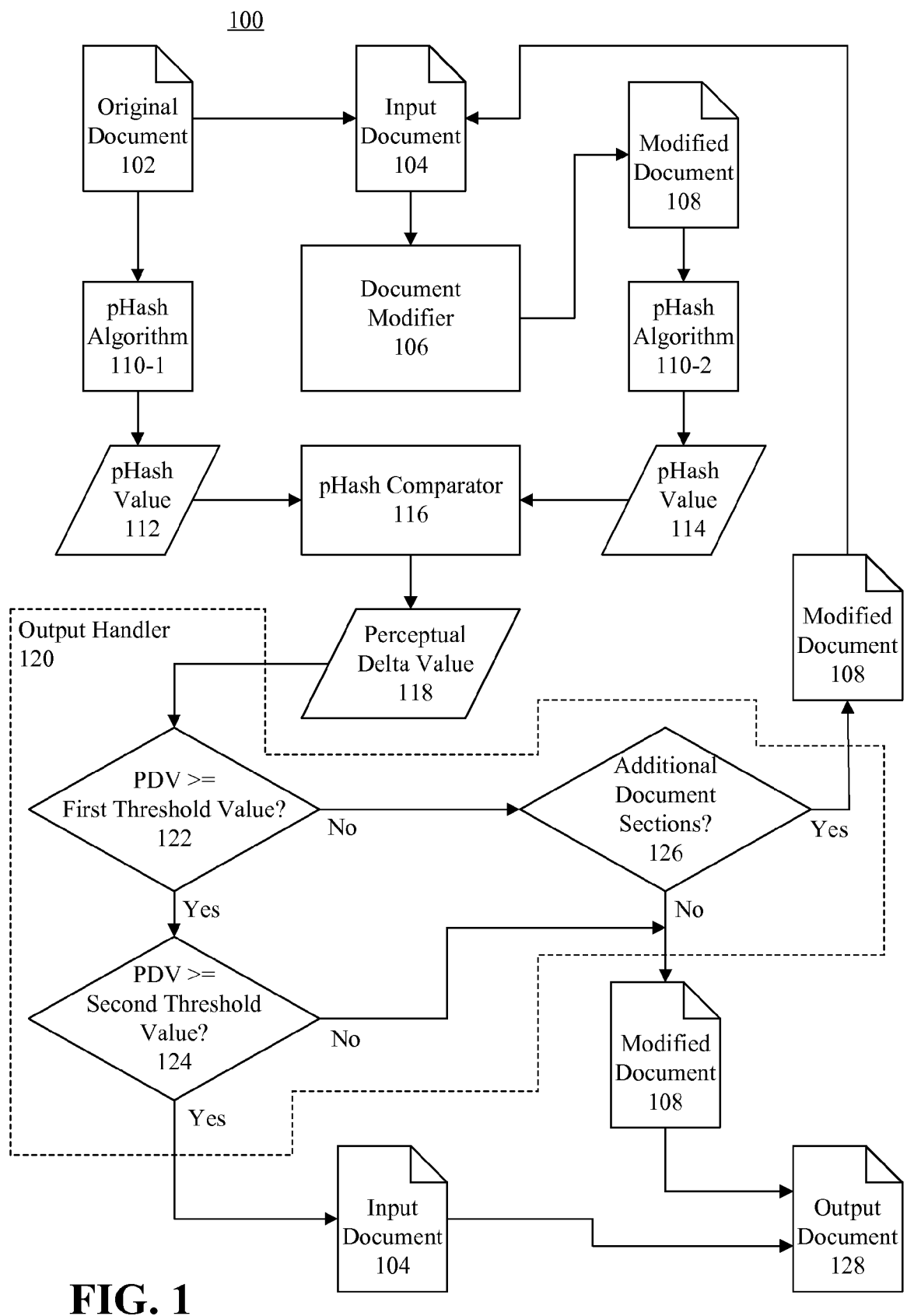
FIG. 1 is a flow diagram illustrating a process for optimizing a layout of an electronic document in accordance with one embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection my be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The embodiments disclosed within this specification relate to optimizing the layout of electronic documents. More particularly, the embodiments disclosed herein present a method and system that adds one or more document sections to respective pages of a modified document without increasing the display size of the pages, thereby reducing the number of pages required to present a document. Although the display size of content presented in the page is reduced, the present invention ensures that the perceptual quality of the size-reduced content is not significantly degraded with respect to the perceptual quality of the content as presented in the original document. In this regard, the present invention can dynamically select an appropriate number of document sections to be combined in each page of the modified document. As used herein, combining document sections onto a page means to add those document sections to the page such that the document sections are visible when the document is opened and/or printed.

FIG. 1 is a flow diagram 100 illustrating a process for optimizing a layout of an electronic document in accordance with one embodiment of the present invention. In the process, an original electronic document (hereinafter "original document") 102 can be received by a document modifier 106 as an input document 104. As used herein, an electronic document is an electronic file comprising content. As used herein, content may refer to alphanumeric text, characters (e.g., ASCII characters), graphics (e.g., drawings, pictures, illustrations, etc.), tables, or any other information that may be presented to a user when the electronic document is opened by a suitable application and/or printed by a suitable application. When opened, the electronic document can be separated into one or more pages, each of which may include one or more document sections.

The pages may be separated by page breaks, though this need not be the case. Further, a document section can comprise content presented within a page, or content within a portion of a page. For example, a document section can comprise the entire content that is presented on a particular page when the original document is opened or printed. In another example, a document section can comprise a sentence or paragraph presented on a page, a table presented on a page, one or more graphics presented on a page, or the like.

The document modifier 106 can modify the input document 104 to generate a modified document 108. Specifically, the document modifier 106 can combine a plurality of document sections to at least a first page within the document. For example, the document modifier 106 can combine two pages of the input document 104 into a single page, combine four pages of the input document into a single page, combine six pages of the input document into a single page, combine nine pages of the input document into a single page, or combine any other number of pages into a single page. Other document sections not combined into the first page of the modified document 108 can be combined into other pages of the modified document. In doing so, the document modifier 106 can reduce a display size of the content so that each of the document sections selected to fit into a particular page in the modified document 108 fit onto that page.

The document sections can be recursively added to the various pages of the input document. In this regard, during a first pass of document size reduction, the original document 102 can be provided to the document modifier 106 as an input document 104, and document modifier 106 can halve the number of pages of the input document 104 to generate the modified document 108. In other words, the document modifier can add two document sections to each page of the modified document 108. In a second pass, the modified document can be document modifier 106 as a new input document 104, and the document modifier 106 can have the number of pages of the new input document to generate a new modified document 108. After each pass, the perceptual quality of the modified document 108 can be evaluated, as will be described herein, and document section combinations can be accepted and rejected. The process can repeat until the modified document is optimized to condense as many document sections onto each page that will fit onto each page while maintaining a minimum level of perceptual quality.

In one arrangement, the document modifier 106 can generate multiple pages for the modified document 108 on each pass. In another arrangement, the modified document modifier 106 can continue adding document sections to a first page until that page is optimized, and then proceed adding document sections to a second page until that page is optimized, and so on. In the case in which the document modifier 106 processes the entire input document 104 in a single pass, the modified document 108 can contain each of the resulting pages. In the case in which the document modifier 106 processes one page of the modified document 108 in any given pass, the modified document 108 may contain a subset of the entire set of document sections from the original document 102 until the process is complete, at which time the final modified document 108 can contain the entire set of document sections.

A perceptual hash (pHash) algorithm 110-1 can be applied to perform a pHash on the document sections, as presented in the original document 102, which are combined with other document sections in the modified document 108. Similarly, a pHash algorithm 110-2 can be applied to perform a pHash after each pass on the document sections having reduced size as presented in the modified document 108. The pHash algorithm 110-1 and pHash algorithm 110-2 can be the same pHash algorithm, but are depicted in different blocks of FIG. 1 to illustrate the flow of data in the flow diagram 100.

The pHash algorithm 110-1 can identify perceptual features of the content in the applicable document sections of the original document 102 and output a corresponding pHash value 112 derived from such perceptual features. Similarly, the pHash algorithm 110-2 can identify perceptual features of the content in the applicable document sections of the modified document 108 and output a corresponding pHash value 114 derived from such perceptual features. As such, performing pHash may be considered to be analogous to analyzing a fingerprint. The pHash algorithm 110 can be use discrete cosine transformation (DCT), Marr Wavelets, Hamming distance, or any other suitable techniques to generate one or more values corresponding to perceptual features of document sections. In this regard, each pHash value 112, 114 can comprise one or more values, or data formatted in a suitable arrangement, for example as a data array. Still, other data formats may be used and the invention is not limited in this regard. The pHash value 112 need only be generated once since the original document 102 likely will not change during the process. The pHash value 114, however, can be regenerated after each pass of document section combination.

The pHash values 112, 114 can be input to a pHash comparator 116, which can compare the pHash values 112, 114 to one another and generate a perceptual delta value 118. The perceptual delta value 118 can represent perceptual differences between content in the original document 102 and the corresponding content in the modified document 108. In other words, the perceptual delta value 118 can indicate how visually distorted the document sections have become due to their visual size reduction. The perceptual delta value 118 can comprise data formatted in a suitable arrangement, for example as a data array or in another suitable format.

The perceptual delta value 118 can be input to an output handler 120. The output handler 120 can process the perceptual data value 118 to make determinations as to whether additional document content may be added to the modified document 108, the modified document 108 may be provided as an output document 128, or the input document 104 may be provided as the output document 128 in lieu of the modified document 108. As such, the output hander 120 can implement corresponding decision processes.

Referring to decision box 122, a determination can be made as to whether the perceptual delta value 118 at least equals a first threshold value. In other words, a determination can be made as to whether the perceptual differences between the content in the original document 102 and the corresponding content in the modified document 108 have reached a first threshold level. If the perceptual delta value 118 at least equals the first threshold value, it is likely that further reduction in the size of the content as visually presented may make the content illegible or otherwise difficult to read. Thus, the addition of further document sections to the modified content 108 (e.g., to a page) may not be desirable.

If the perceptual delta value 118 at least equals the first threshold value, the process can proceed to decision box 124 and a determination can be made as to whether the perceptual delta value 118 at least equals a second threshold value. If not, this may indicate that the content as presented in the modified document 108 is sufficiently legible, and the output handler 120 can output the modified document 108 as the output document 128. If the perceptual delta value 118 does at least equal the second threshold value, this may indicate that the content as presented in the modified document 108 is not sufficiently legible. Accordingly, the output handler 120 can reject the most recent combination of document sections into the modified document 108, or the page of the modified document 108 being analyzed, and output the input document 104 (or page of the input document 104 being analyzed) as the output document 128 in lieu of the modified document 108.

Again referring to decision box 122, if the perceptual delta value 118 does not at least equal the first threshold value, this may indicate that further document sections can be added to the modified document 108. Accordingly, at decision box 126, a determination can be made as to whether additional document sections from the input document 104 are available to add to the modified document 108. If, for example, the modified document 108 contains a single page, a determination can be made as to whether additional document sections are available from the input document 104 to add to the page. If not, the output handler 120 can output the modified document 108 as the output document 128. If additional document sections are available to add to the page, the output handler 120 can provide the modified document 108 to the document modifier 106 as an input document 104 for a next pass of the process depicted in the flow diagram 100.

If the modified document 108 provided by the output handler 120, now the input document 104, contains a single page, the processing can be performed recursively as many times as needed, adding one or more additional document sections to the input document 104 to the new modified document 108, until the perceptual delta value 118 reaches the first threshold value. Once the first threshold value is reached, either the final modified document 108 or the final input document 104 will be output as the output document 128, depending on whether the second threshold value is reached as previously described. In an arrangement in which the document modifier 106 modifies one page of the modified document 108 at a time, if there are additional document sections in the original document 102 that are not included in the output document 128, the process described in the flow diagram 100 can be repeated to identify such document sections and combine additional document sections into one or more additional modified document pages. This time, however, the input document 104 need not contain document sections already added to the output document 128. This process can recursively repeat until each of the document sections in the original document 102 has been output in the output document 128. In this regard, as each new output document 128 is generated, the new output document 128 can be combined with the previous output documents 128 until a final output document contains each of the document sections contained in the original document 102.

In one aspect, the document sections can be combined in an order that is different than the order in which they are presented in the original document 102. In illustration, assume that a first document section contains text, a second document section contains graphics, and a third document section contains text. The document modifier can combine the first and third document sections into a single page, while allocating the second document section to a preceding or following page of the modified document 108.

As noted, in lieu of processing one modified document page at a time, the document modifier 106 can process multiple pages for the modified document 108 in each pass of the process depicted by the system flow diagram 100. For example, when the original document 102 is provided as the input document 104, the document modifier 106 can, on a first pass, combine successive pairs of document sections into respective pages. If, after the first pass, the perceptual data value 118 does not equal the first threshold, on a second pass of the process, the document modifier 106 can combine each successive pair of pages into a respective single page. If, after the second pass, the perceptual data value 118 does not equal the first threshold, on a third pass of the process, the document modifier 106 can again combine each successive pair of the newly created pages into a respective single page. Further, document sections can be moved from one page to another to fill in any blank spaces that may be present. Moreover, depending on the perceptual data values 118 generated for individual pages, a determination can be made to combine certain pages into a single page, while choosing not to further combine certain pages. This process can be performed recursively until each page that remains can be combined no further without a corresponding perceptual delta value 118 reaching the second threshold value.

In one aspect, a user input can be received or a default setting can be accessed which indicates a maximum number of document sections to include on each page of the modified document. For instance, a user can specify to include no more than four document sections on each page. In such case, the process of combining document sections can cease after one or more pages of the modified document include four document sections.

Figure 2:
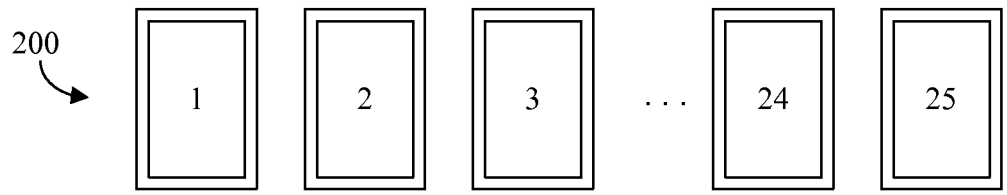
FIG. 2 depicts a succession of recursive additions of document sections to a page in accordance with an embodiment of the present invention.
Figure 2:
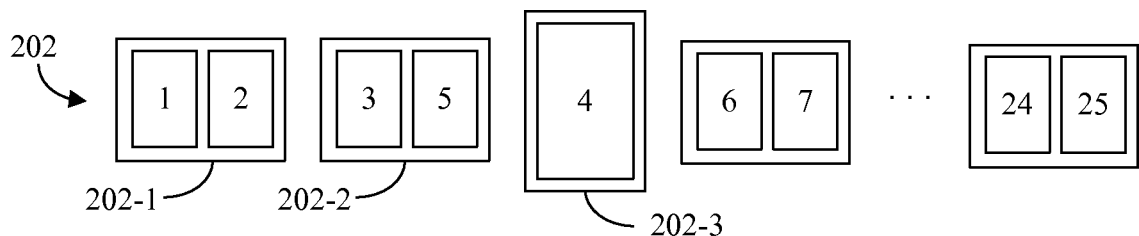
Figure 2:
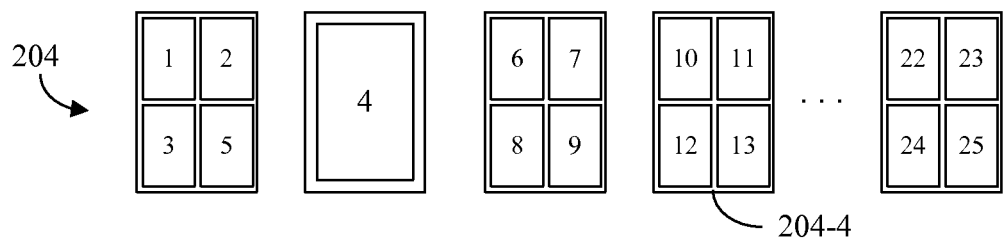
Figure 2:
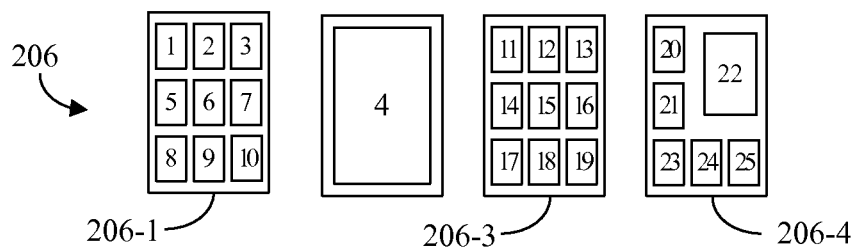

For further understanding of the present invention, FIG. 2 depicts a succession of recursive additions of document sections of the original document into pages of a modified document in accordance with an embodiment of the present invention. In FIG. 2, an original document which comprises a plurality of pages 200 is depicted. As noted, each page 200 can be a page of the document, though this need not be the case. Each page 200 can include one or more respective document sections 1, 2, 3 . . . 24, 25. In this particular example, each page 200 includes a respective document section, though the invention is not limited in this regard and each page 200 may include two or more document sections.

On a first pass of the process depicted in FIG. 1, the document sections 1-25 can be combined to create one or more pages 202. For example, each successive pair of document sections it 1-25 can be combined into a respective page. In one arrangement, if the perceptual delta value associated with any of the pages 202 reaches the second threshold value, the combination of document sections in those pages 202 can be rejected. For example, if the perceptual delta value associated with a page comprising the document sections 3, 4 reaches the second threshold value, the combination of document sections 3, 4 into the same page can be rejected. Further, a perceptual delta value can be determined for each of the document sections 3, 4 to determine whether one of the document sections 3, 4 can be size reduced when not combined with the other. In this example, it can be determined that document section 3 may be size reduced and result in a perceptual delta value that is under the second threshold value, white document section 4 may not. For example, document section 4 may contain a graphic that cannot be size reduced without the perceptual delta value reaching the second threshold value. In this case, the document section 4 can be allocated to its own page 202-3, while document section 3 can be combined with document section 5 in a page 202-2. In this regard, the document sections as presented in the modified document can be reordered no as to be presented in an order that is different than the order in which the document sections are presented in the original document. The successive pairing of the remaining document sections 6-25 can continue.

In another example, document sections 1-25 that exclusively contain text can be identified, and document sections 1-25 that do not exclusively contain text also can be identified. The latter document sections 1-25 can comprise, for example, graphics, tables, or the like. At least a subset of the document sections 1-25 that contain text, for example document sections 1, 2, 3 and 5, can be grouped and added to one or more pages of the modified document, for instance pages 202-1 and 202-2. One or more document sections 1-25, such as document section 4, that do not exclusively contain text can be added to a different page of the modified document, for instance to page 202-3. Thus, the document sections can be reordered in the modified document with respect to the order in which they are presented in the original document.

In one arrangement, the pages 202 can be the same size as the pages 200. Further, the orientation of the pages 202 can be selected to optimize placement of the document sections 1-25 within the pages 202. For example, the pages 200 can be oriented in a portrait layout, and the pages 202 can be oriented in a landscape layout.

On a second pass of the process, the document sections 1-25 can be combined to create one or more pages 204 comprising four document elements 1-25. Since it already was determined that document element 4 cannot be further size reduced, document element 4 need not be combined with any other document elements. Again, the orientation of the pages 204 can be selected to optimize placement of the document sections 1-25 within the pages 204. For example, the pages 204 can be oriented in a portrait layout.

On a third pass of the process, the document sections 1-25 can be combined to create one or more pages 206 comprising nine document elements 1-25. Again, the orientation of the pages 206 can be selected to optimize placement of the document sections 1-25 within the pages 206.

As noted, it is not required that the document elements 1-25 in any one page 202, 204 be kept together when successive passes of the process are implemented. For example, page 204-4 may comprise document elements 10-13, while document element 10 may be contained in page 206-1 and document elements 11-13 may be contained in page 206-3. Further, a page need not be completely filled with document elements 1-25. For example, the original document may not contain a sufficient number of document elements to completely fill the par 206-4. In such case, the orientation of the par 206-4 can be adjusted to optimize the size of the content in the document elements 20-25, though this is not a requirement. Also, as noted, a document element can be the entire content of a document page of the original document, but this need not be the case. Indeed, a document element can be a sentence, a paragraph, a graphic, a table, etc.

Further, assume that a document section, for example document section 22, cannot be size reduced further without the perceptual delta value reaching the second threshold value. In such case, other document sections 20, 21 and 23-25 on the page 206-4 can be further size reduced in the third pass, while further reduction of the document element 22 can be rejected, and the size of document element 22 can be left at the size it was after the second pass. The respective document sections 20-25 can be arranged on the page 206-4 in a suitable manner.

Figure 3:
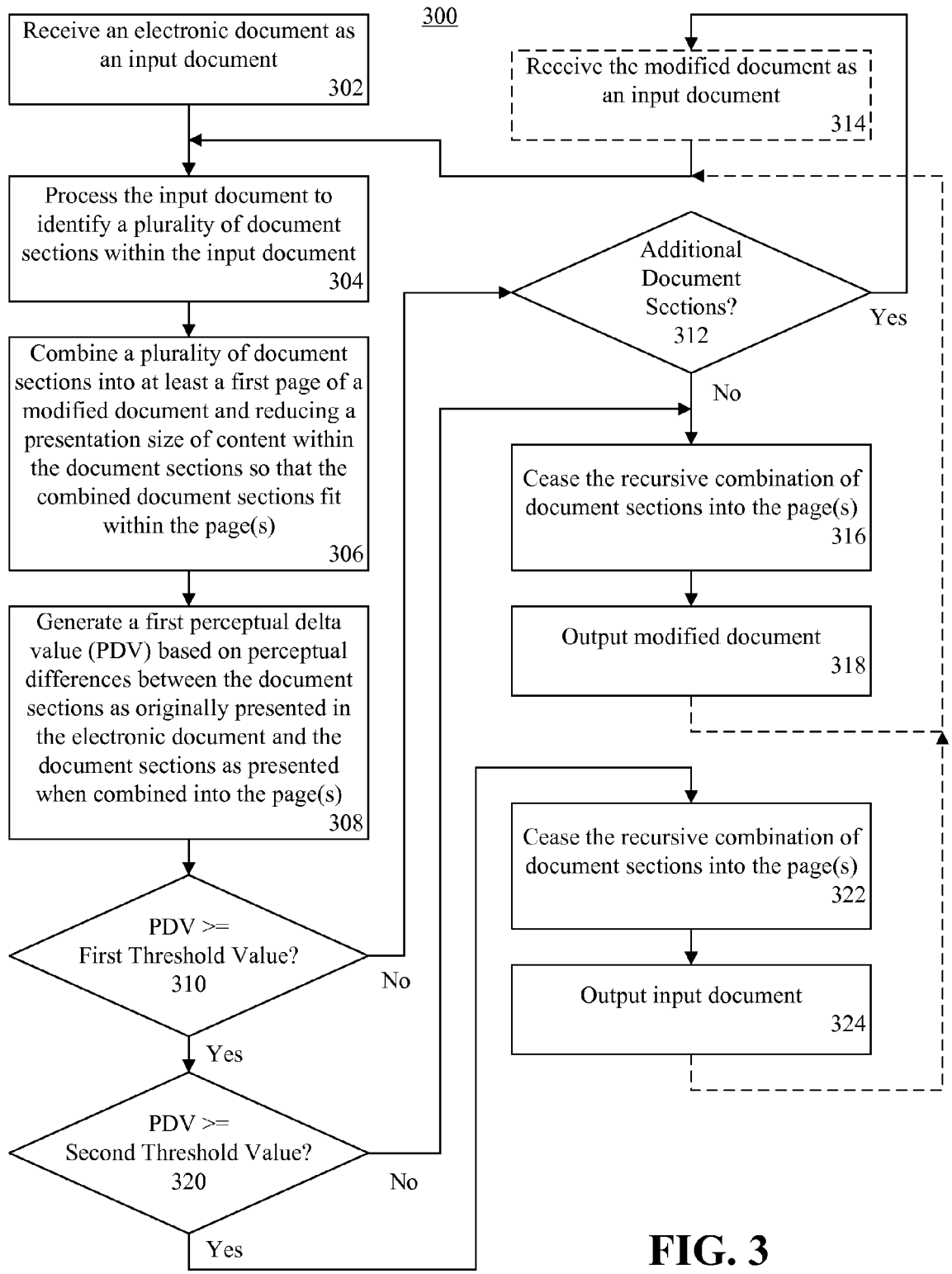
FIG. 3 is a flow chart illustrating a method of optimizing a layout of an electronic document in accordance with another embodiment of the present invention.

FIG. 3 is a flow chart illustrating a method 300 of optimizing a layout of an electronic document in accordance with another embodiment of the present invention. At step 302, an electronic document can be received as an input document. At step 304, the input document can be processed to identify a plurality of document sections within the input document.

At step 306, a plurality of document sections can be combined into at least a first page of a modified document. A presentation size of content within the document sections can be reduced so that the combined document sections fit within the page(s). At step 308, a first perceptual delta value can be generated based on perceptual differences between the document sections as originally presented in the electronic document and the document sections as presented when combined into the page(s) in the modified document. As noted, the perceptual delta value can be generated based on a comparison of a pHash value generated for the document sections as they are presented in the original document and a pHash value generated for the document sections as they are presented in the modified document.

At decision box 310, a determination can be made as to whether the perceptual delta value at least equals a first threshold value. If not, at decision box 312 a determination can be made as to whether additional document sections are available to combine within the page(s). In illustration, if one page at a time is being generated for the modified document, the determination can pertain to whether additional document sections that have not been added to the page are available in the input document. If so, the process can return to step 304.

In an arrangement in which multiple pages of the modified document are being generated in each pass, the determination can pertain to whether document sections from other pages can be combined into the document sections on the particular page. If so, the process can proceed to step 314 and the modified document can be received as an input document, and the process can return to step 304.

Again referring to decision box 312, if no additional document sections are available, at step 316 the recursive combination of document sections into the page(s) can cease. At step 318, the modified document can be output.

Again referring to decision box 310, if the perceptual delta value does at least equal the first threshold value, the process can proceed to decision box 320 and a determination can be made as to whether the perceptual delta value at least equals a second threshold value. If not, the process can proceed to step 316 and recursive combination of the document sections into the page(s) can be ceased. At step 318, the modified document can be output.

In an arrangement in which one page of the modified document is being generated in each pass, the process can return to step 304 and additional document sections from the original document can be combined into a next page of the modified document. In this embodiment, each new modified document that is output can be combined with previous modified documents to create a final modified output document. The process and recursively continue until each of the document sections of the original electronic document are contained within the final modified output document.

Referring again to decision box 320, if the perceptual delta value at least equals the second threshold value, at step 322 recursive combination of document sections can be ceased. At step 324, in lieu of outputting the modified document, the input document can be output. Again, in an arrangement in which one page of the modified document is being generated in each pass, the process can return to step 304 and additional document sections from the original document can be combined into a next page of the modified document. The process can end when each of the document sections of the original electronic document are contained within the final modified output document.

Figure 4:
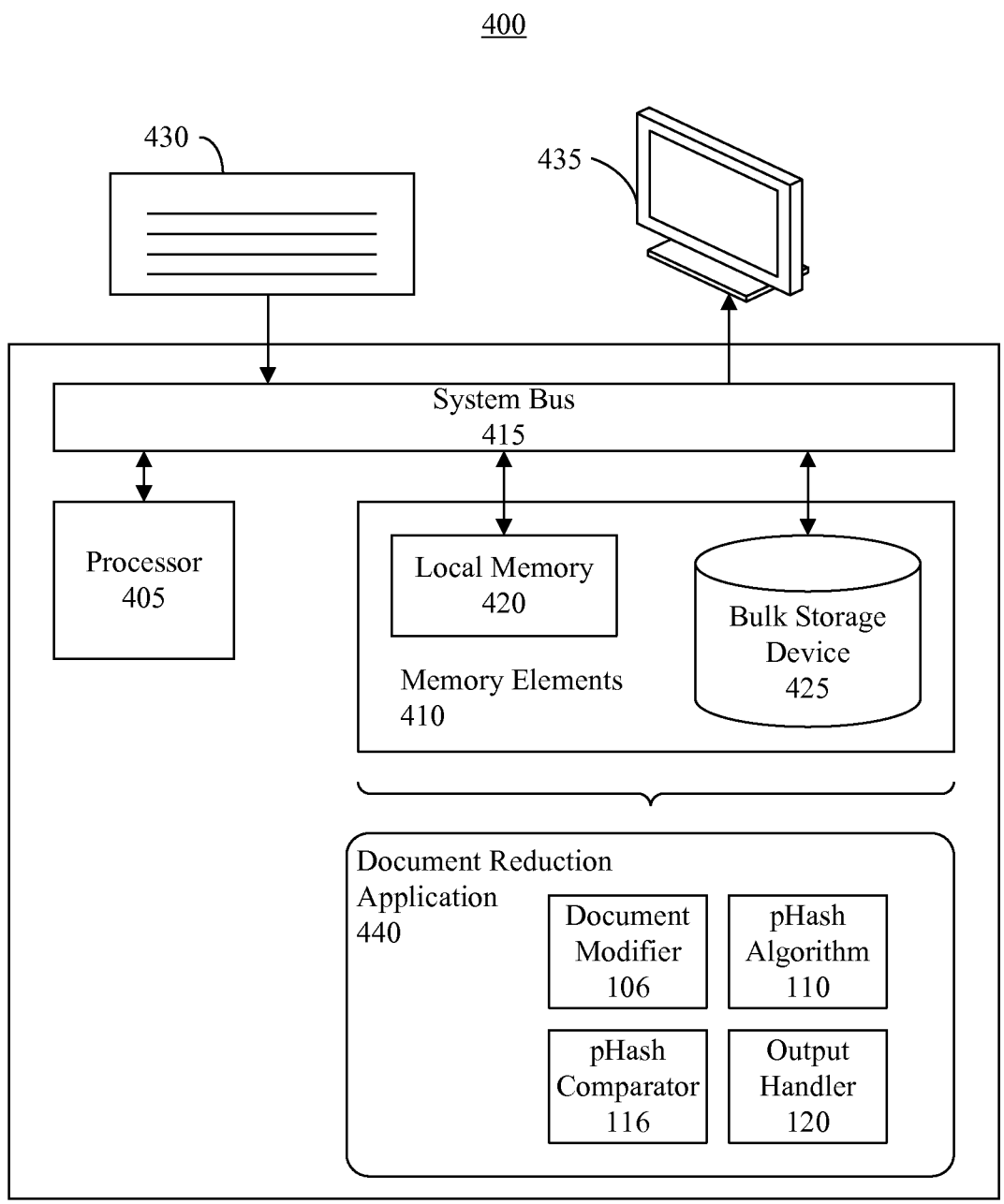
FIG. 4 is block diagram illustrating a system for optimizing a layout of an electronic document in accordance with another embodiment of the present invention.

FIG. 4 is block diagram illustrating a system 400 for optimizing a layout of an electronic document in accordance with another embodiment of the present invention. The system 400 can include at least one processor 405 coupled to memory elements 410 through a system bus 115. As such, the system 400 can store program code within memory elements 410. The processor 405 can execute the program code accessed from memory elements 410 via a system bus 415. In one aspect, for example, the system 400 can be implemented as computer that is suitable for storing and/or executing program code. It should be appreciated, however, that the system 400 can be implemented in the form of any system comprising a processor and memory that is capable of performing the functions described within this specification.

Memory elements 410 can include one or more physical memory devices such as, for example, local memory 420 and one or more bulk storage devices 425. Local memory 420 refers to random access memory or other non-persistent memory device(s) generally used during actual execution of the program code. Bulk storage device(s) 425 can be implemented as a hard disk drive (HDD), solid state drive (SSD) or other persistent data storage device. The system 400 also can include one or more cache memories (not shown) that provide temporary storage of at least some program code in order to reduce the number of times program code must be retrieved from bulk storage device 425 during execution.

Input/output (I/O) devices such as a keyboard 430, a display 435, and a pointing device (not shown) optionally can be coupled to the system 400. The devices can be coupled to the system 400 either directly or through intervening I/O controllers. Network adapters also can be coupled to the system 400 to enable the system 400 to become coupled to other systems, computer systems, remote printers, and/or remote storage devices through intervening private or public networks. Modems, cable modems and Ethernet cards are examples of different types of network adapters that can be used with the system 400.

As pictured in FIG. 1, memory elements 410 can store a document reduction application 440. The document reduction application 440, being implemented in the form of executable program code, can be executed by the system 400 to perform the functions and processes described herein. For example, the document reduction application 440 can include the document modifier 106, the pHash Algorithm 110, the pHash Comparator 116 and the Output Handler 120 of FIG. 1, the functions of each have been described. The document reduction application 440 also can include other suitable modules, functions and/or algorithms, and the invention is not limited in this regard.

The document reduction application 440 can process an electronic document and output a modified document in which document sections from the original electronic document are size reduced and combined into fewer pages than the number of pages contained in the original electronic document, while maintaining a minimum level of perceptual quality. As used herein, "outputting" and/or "output" can mean storing in the memory elements 410, for example, writing to a file stored in the memory elements 410, writing to the display 435 or other peripheral output device, printing, exporting, or the like.

Like numbers have been used to refer to the same items throughout this specification. The flow diagram, flowchart and block diagram in the Figures illustrate the architecture, functionality, and operation of possible implementations of systems, methods and computer program products according to various embodiments of the present invention. In this regard, each block in the flow diagram, flowchart and block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the flow diagram, flowchart and block diagram, and combinations of blocks in the flow diagram, flowchart and block diagram, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. Within a system comprising a processor and a memory, a method of optimizing a layout of an electronic document, the method comprising:

via the processor, processing the electronic document to identify a plurality of document sections within the electronic document;

recursively, combining a plurality of document sections in at least a first page of a modified document and reducing a presentation size of content within the document sections so that the combined document sections fit within the first page of the modified document; and with each recursive combination of document sections:

identifying first perceptual features of content of the combined document sections based on the content as presented in an original version of the electronic document, and generating a corresponding first perceptual value derived from the first perceptual features wherein the first perceptual value is a first perceptual hash value generated by performing a first perceptual hash on the content of the combined document sections as presented in the original version of the electronic document to determine a first perceptual hash value;

identifying second perceptual features of content of the combined document sections based on the content as presented in a modified version of the electronic document in which the document sections are combined into the first page, and generating a corresponding second perceptual value derived from the second perceptual features, wherein the second perceptual value is a second perceptual hash value generated by performing a second perceptual hash on the document sections as presented in the modified version of the electronic document in which the document sections are combined into the first page;

generating a first perceptual delta value by comparing the first perceptual value derived from the first perceptual features to the second perceptual value derived from the second perceptual features;

determining whether the first perceptual delta value at least equals a first threshold value;

responsive to determining that the first perceptual delta value at least equals the first threshold value, ceasing the recursive combination of document sections into the first page; and responsive to determining that the first perceptual delta value does not at least equal the first threshold value, continuing the recursive combination of document sections in at least the first page.

2. The method of claim 1, further comprising:

responsive to determining that the first perceptual delta value at least equals the first threshold value, outputting at least the first page of the modified document as an output document.

3. The method of claim 1, further comprising:

responsive to determining that the first perceptual delta value at least equals the first threshold value, determining whether the first perceptual delta value at least equals a second threshold value;

responsive to determining that the first perceptual delta value at least equals the second threshold value, rejecting a most recent combination of document sections into the first page of the modified document; and responsive to determining that the first perceptual delta value does not at least equal the second threshold value, outputting at least the first page of the modified document as an output document.

4. The method of claim 1, wherein recursively adding at least one document section to the first page comprises recursively adding a plurality of document sections to the first page.

5. The method of claim 1, further comprising:
identifying document sections that exclusively contain text;
identifying document sections that do not exclusively contain text; and
grouping at least a subset of the document sections that exclusively contain text;
wherein recursively adding at least one document section to the first page comprises adding the grouped subset of document sections that exclusively contain text to the first page and adding each of the document sections that do not exclusively contain text to a second page.

6. Within a system comprising a processor and a memory, a method of optimizing a layout of an electronic document, the method comprising:
processing, via the processor, the electronic document to identify a plurality of document sections within the electronic document;
recursively, combining a plurality of document sections in at least a first page of a modified document and reducing a presentation size of content within the document sections so that the combined document sections fit within the first page of the modified document; and
with each recursive combination of document sections:
identifying first perceptual features of content of the combined document sections based on the content as presented in an original version of the electronic document, and generating a corresponding first perceptual value derived from the first perceptual features;
identifying second perceptual features of content of the combined document sections based on the content as presented in a modified version of the electronic document in which the document sections are combined into the first page, and generating a corresponding second perceptual value derived from the second perceptual features;
generating a first perceptual delta value by comparing the first perceptual value derived from the first perceptual features to the second perceptual value derived from the second perceptual features;
determining whether the first perceptual delta value at least equals a first threshold value;
responsive to determining that the first perceptual delta value at least equals the first threshold value, ceasing the recursive combination of document sections into the first page;
responsive to determining that the first perceptual delta value does not at least equal the first threshold value, continuing the recursive combination of document sections in at least the first page;
identifying document sections not added to the first page;
recursively, adding at least one of the identified documents sections to a second page of the modified document and reducing a display size of content within the second page so that a display size of the second page is not increased due to the added at least one of the identified document sections; and
with each addition of at least one of the identified document sections to the second page:
performing a perceptual hash on the second page to determine a second perceptual delta value;
determining whether the second perceptual delta value at least equals the first threshold value;
responsive to determining that the second perceptual delta value at least equals the first threshold value, ceasing the addition of the identified document sections to the second page; and
responsive to determining that the second perceptual delta value does not at least equal the first threshold value, continuing the addition of the identified document sections to the second page.

7. Within a system comprising a processor and a memory, a method of optimizing a layout of an electronic document, the method comprising:
via the processor, processing the electronic document to identify a plurality of document sections within the electronic document;
performing a first perceptual hash on the document sections as originally presented in the electronic document to determine a first perceptual hash value;
recursively, combining a plurality of document sections in at least a first page of a modified document and reducing a presentation size of content within the document sections so that the combined document sections fit within the first page of the modified document; and
with each recursive combination of document sections:
performing a second perceptual hash on the document sections as presented when combined into the first page to determine a second perceptual hash value;
generating a first perceptual delta value based on perceptual differences between the document sections as originally presented in the electronic document and the document sections as presented when combined into the first page, wherein generating the first perceptual delta value comprises comparing the first and second perceptual hash values;
determining whether the first perceptual delta value at least equals a first threshold value;
responsive to determining that the first perceptual delta value at least equals the first threshold value, ceasing the recursive combination of document sections into the first page; and
responsive to determining that the first perceptual delta value does not at least equal the first threshold value, continuing the recursive combination of document sections in at least the first page.

* * * * *